United States Patent [19]
Ichiki et al.

[11] 3,793,174
[45] Feb. 19, 1974

[54] METHOD OF TREATING WASTE WATER CONTAINING LIGNINSULFONATE

[75] Inventors: Minoru Ichiki; Masahito Ishii, both of Tokyo, Japan

[73] Assignee: Mitsui Mining & Smelting Co., Ltd., Tokyo, Japan

[22] Filed: Sept. 6, 1972

[21] Appl. No.: 286,713

[30] Foreign Application Priority Data
Sept. 9, 1971  Japan.................................. 46-69977

[52] U.S. Cl.................... 204/149, 210/44, 204/152, 204/130
[51] Int. Cl.............................................. C02c 5/12
[58] Field of Search ........... 204/149, 152, 130, 277; 210/42, 44

[56] References Cited
UNITED STATES PATENTS

| 470,181 | 3/1892 | Collins............................ 204/277 X |
| 478,048 | 6/1892 | Collins............................ 204/277 X |
| 2,823,178 | 2/1958 | Ritter................................... 204/131 |
| 3,691,041 | 9/1972 | Stralser........................... 204/149 X |
| 3,706,646 | 12/1972 | Gibson, Jr. et al. ................ 204/149 |

Primary Examiner—John H. Mack
Assistant Examiner—A. C. Prescott
Attorney, Agent, or Firm—Woodhams, Blanchard & Flynn

[57] ABSTRACT

A method of treating the waste water containing ligninsulfonate, wherein waste water contains sodium salt, calcium salt, potassium salt, etc. of ligninsulfonic acid, comprises the steps of: conducting electrolysis with a ferrous anode plate utilizing said waste water as an electrolyte which has been made to have pH within the range from 5 to 9 prior to the start of electrolysis, while air is being blown therein by a suitable means, whereby said ligninsulfonate is rendered insoluble; and subsequently separating said insoluble substances from the mother liquid by floating them.

2 Claims, No Drawings

METHOD OF TREATING WASTE WATER CONTAINING LIGNINSULFONATE

BACKGROUND OF THE INVENTION

1. Field of the Invention

The present invention relates to a method of treating waste water containing ligninsulfonate.

2. Description of the Prior Art

The conventional methods for purifying waste water, which is produced by industries employing ligninsulfonate as a raw material and the paper pulp industry, by separating ligninsulfonic acid or ligninsulfonate therefrom, are usually typified by the following: A method comprising the steps of first collecting fibers therefrom by screening and neutralizing the waste water with calcium hydroxide for precipitation; a method wherein the waste water is sprayed onto a filtering bed in order to decompose ligninsulfonate; by an activated-sludge method for decomposing ligninsulfonate by bacteria also; and an aeration method.

However, the treatment employing chemicals for precipitation requires a large amount of calcium hydroxide, and also produce a sludge which is difficult to dehydrate.

Further, a satisfactory efficiency cannot be expected from purification based upon the method wherein the waste water is sprayed onto a filtering bed, with regard to a waste water from sulfurous acid pulp containing therein free sulfurous acid because this is detrimental to the bacteria. Also lignins or organic substances of lignin are considered, from the microbiological point of view, to be very difficult to decompose.

The aeration method does not demonstrate as much efficiency as the preceding method does; in other words it is inferior in purifying the waste water. As to the activated sludge method, it requires a large amount of water for dilution thereby even after neutralization of free sulfurous acid; accordingly there is some difficulty in application of this method.

Furthermore, there are other methods in which oxidation is conducted by means of bacteria and the waste water is mixed with the concentrated organic waste water for methane fermentation. However, a successful result could not be expected therefrom because the sulfurous acid, ligninsulfonic acid, etc. restrain the activity of bacteria; accordingly a trial of this method has not been carried out yet.

It is considered that the method of treating waste water wherein said waste water is sprayed onto the filtering bed of two steps is the most economical and effective in all the above-mentioned methods, so long as a sufficient area is available.

SUMMARY OF THE INVENTION

We have discovered that ligninsulfonate contained in the waste water can be separated easily and efficiently therefrom by subjecting said waste water to electrolysis using a ferrous anode plate. The present invention is established on the basis of this finding.

The object of the present invention is to provide a method of separating ligninsulfonate from waste water containing same, economically and effectively.

Another object of the present invention is to provide a method of treating waste water containing ligninsulfonate without employment of any apparatus of a large size.

That is, the present invention relates to a method of treating waste water containing ligninsulfonate characterized by the steps of: conducting electrolysis using a ferrous anode plate utilizing said waste water as an electrolyte having pH in the range from 5 to 9, while air is blown therein, whereby said ligninsulfonate becomes insoluble; and subsequently separating said insoluble substances from the mother liquid by floating them.

DETAILED DESCRIPTION OF THE INVENTION

As is apparent from the foregoing description, in the present invention the electrolysis is conducted utilizing the waste water containing ligninsulfonate therein as an electrolyte.

Thereby it is supposed that, as the electrolysis proceeds, ligninsulfonic acid ion of the said ligninsulfonate (sodium salt, potassium salt, or calcium salt) loses its charge at or in the vicinity of the anode, whereby said ligninsulfonate is rendered insoluble to form floc.

The matter of primary importance according to the present invention is that the electrodes, especially the anode, should consist of iron. The electrolysis can perform purification of the waste water to some extent, even when an anode plate made of aluminum is employed. Through experiments, however, it has been found out that employment of a ferrous anode plate results in an exceedingly superior efficiency of purification in comparison with an anode plate made of other materials.

Well known materials, for instance, such as copper, nickel, iron, etc. are applicable to the cathode plate.

Another matter of importance according to the present invention is to minimize the ferrous ions dissolved in is the electrolyte. This is achieved by blowing sufficient air into the electrolytic cell for the purpose of changing divalent ferrous ions, which dissolve from the anode plate due to the electrolysis, to trivalent ion.

This air-blowing process serves to prevent the cake from adhering to the inside wall of the electrolytic cell, and also causes easy and complete separation of solid substances from the mother liquid, since the floating of floc can be easily realized as said floc absorbs enough air together with the gas arising from the electrolysis.

Another matter of importance according to the present invention is to keep the pH of the electrolyte in the range from 5 to 9 by adding thereto acid as required, because the progress of the electrolysis makes the electrolyte alkaline, and this disturbs oxidation of ferrous ions.

Even when the waste water has a pH outside the range of 5 to 9, purification thereof can be performed to some extent by the electrolysis; but in this case the efficiency of purification is very small.

Further, during the electrolysis, all the polluting substances, such as heavy metallic ions of zinc, copper, lead, cadmium, mercury, etc. besides fats and oils, hydrogen sulfide, and other fine suspended solids, all of which have been contained within the waste water from the beginning, can be removed therefrom.

As the electrolysis proceeds, all these polluting substances are coagulated together with the floc arising from the ligninsulfonate. They are floated by the electrolysis and are concentrated as scum on the surface of said electrolyte.

Said scum is collected and removed by means of a scum-raking device and so forth, while the purified waste water (or purified liquid) is discharged from the outlet disposed on the side wall or near the bottom of the electrolytic cell.

As above-described, a method according to the present invention, wherein the electrolysis is conducted by employing a ferrous anode plate and utilizing the waste water as an electrolyte, does not need any of separation cells having a complicated structure, and feeding devices by pressure, etc. that are employed by the conventional methods.

The amount of removed sodium ligninsulfonate differed in accordance with the concentration thereof within the waste water. When the waste water contained less than 1,000 ppm of sodium ligninsulfonate, the COD value was decreased to 1/10 or so by 1 hour electrolysis.

In addition, the foregoing was also observed, when the aqueous solution contained calcium salt or potassium salt of ligninsulfonic acid.

TABLE 1

| Waste water before the start of electrolysis | | COD of the limpid liquid staying in the lower portion of the cell after the start of electrolysis (ppm) after the start of electrolysis in minutes | | | | | | | | |
|---|---|---|---|---|---|---|---|---|---|---|
| Concentration of sodium ligninsulfonate (ppm) | COD (ppm) | 10 | 20 | 40 | 60 | 90 | 120 | 240 | 300 | 360 |
| 500 | 398 | 200 | 113 | 63 | 42 | 27 | 16 | 6 | 8 | 6 |
| 1000 | 840 | 800 | 760 | 170 | 85 | 60 | 38 | 19 | 17 | 25 |
| 2000 | 1524 | — | — | 468 | 312 | 264 | 64 | 53 | 39 | 39 |
| 5000 | 3520 | 3520 | 3440 | 2880 | 960 | 824 | 792 | 190 | 103 | 92 |

Further, a method according to the present invention can be applied to the treatment of almost all the waste waters of sulfite pulping, especially waste water containing organic substances soluble to water by ionization such as black liquor, as well as the treatment of the waste water from a variety of industrial factories wherein ligninsulfonate is used as a raw material.

DESCRIPTION OF THE PREFERRED EMBODIMENT

Each of aqueous solutions containing 500 ppm, 1,000 ppm, 2,000 ppm, and 5,000 ppm of sodium ligninsulfonate respectively was taken individually into a 5-liter cell provided with a ferrous anode plate. Then, each of aqueous solutions was subjected to electrolysis with an electric current of 5A and cell voltage of 4.0 V, while air was blown into the cell by an air pump, so as to separate insoluble substances from the mother liquid by floating them.

During the electrolysis as above-mentioned, an examination was carried out, at regular intervals of time, for observing the removal of sodium ligninsulfonate from the mother liquid by checking the COD (Chemical Oxygen Demand) of the liquid by sampling the limpid liquid staying in the lower portion of the cell. The results are shown in Table 1.

What is claimed is:

1. A process for the electrolytic purification of waste water containing ligninsulfonate, which comprises: placing said waste water having a pH in the range of from 5 to 9, as an electrolyte, in an electrolytic cell having cathode means and iron anode means; electrolyzing said waste water in said cell and adding acidic substance to the waste water to continuously maintain the pH thereof in said range so that said iron anode means dissolves in said waste water and insoluble substances are produced in said waste water; blowing air into said waste water in said cell during the electrolysis to oxidize ferrous ions in said waste water to ferric ions and to remove adhering substances from the surfaces of said cell, the insoluble substances produced in said cell including said ligninsulfonate forming a floc which absorbs said air and the gas generated by the electrolysis and floats to the upper surface of the waste water in the electrolytic cell and forms a layer of scum thereon; removing purified waste water from the lower part of the cell; and removing scum from the upper part of the cell.

2. A process of treating the waste water containing ligninsulfonate according to claim 1, wherein said ligninsulfonate is the sodium salt, potassium salt, or calcium salt of ligninsulfonic acid.

* * * * *